Patented Sept. 6, 1932

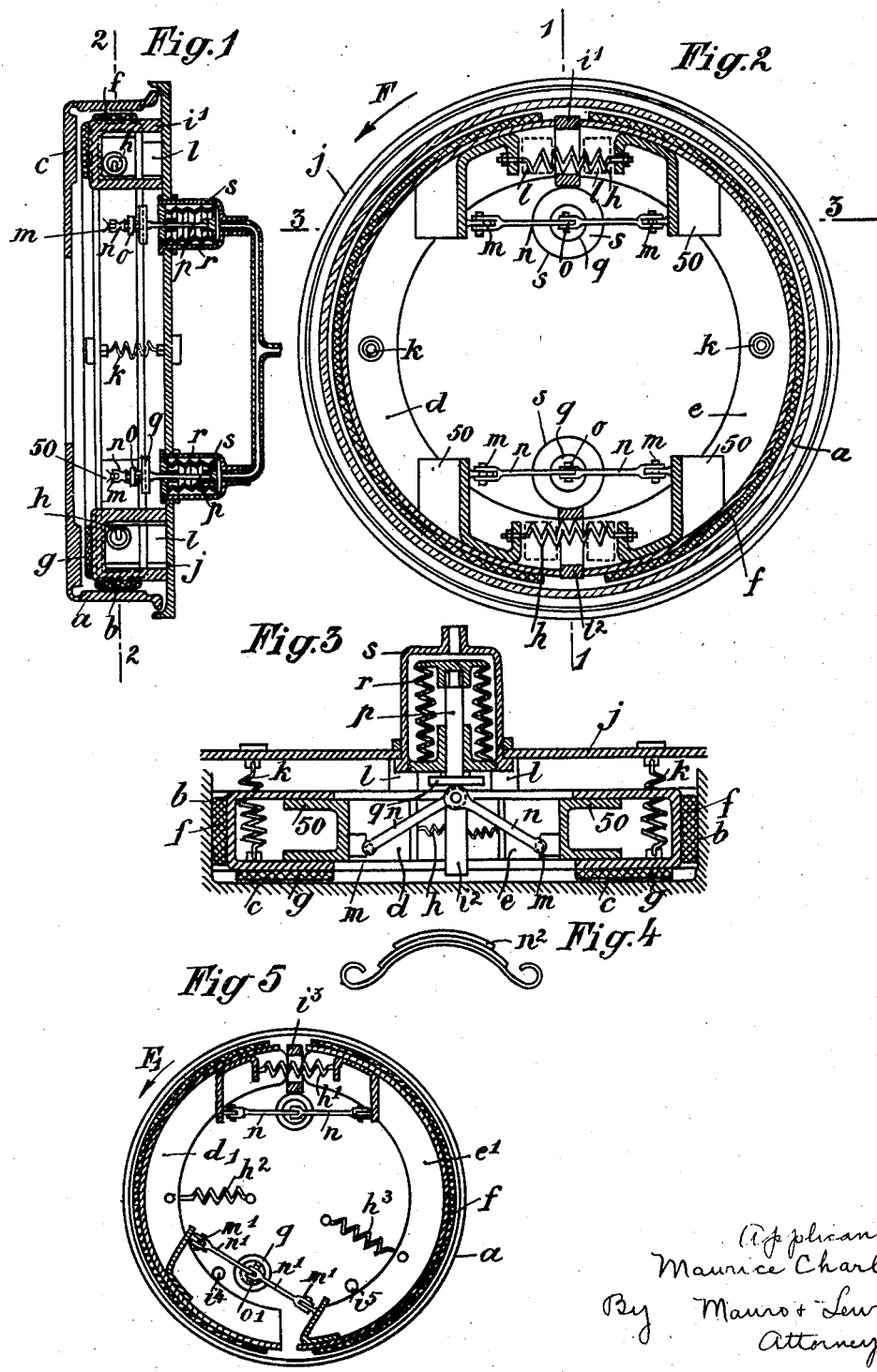

1,875,989

UNITED STATES PATENT OFFICE

MAURICE CHARLES, OF COURBEVOIE, FRANCE

BRAKE SYSTEM

Application filed March 2, 1929, Serial No. 344,004, and in France November 16, 1928.

The present invention has for an object a brake system which is particularly applicable to motor vehicles, and characterized by the fact that braking is obtained by two shoes carrying each two rubbing surfaces, one annular and the other cylindrical, coming separately or simultaneously in contact with the drum of the brake in accordance with the braking power desired.

The description which follows when taken in connection with the accompanying drawing by way of example will enable those skilled in the art to properly understand my invention.

In the drawing—

Fig. 1 is a section through a brake drum taken along the line 1—1 of Fig. 2 and adapted to be controlled hydraulically;

Fig. 2 is a front view of a plate carrying the brake shoes;

Fig. 3 is a section to an enlarged scale along the line 3—3 of Fig. 2;

Fig. 4 is a side view of a spring for taking the place of the control levers of the shoes; and Fig. 5 is a sectional view, analogous to Fig. 2 of a plate with self-tightening brake shoes.

Referring to the drawing more in detail, in a drum $a$ (Fig. 1) provided with a cylindrical surface $b$ and an annular surface $c$ are disposed two shoes $d$ and $e$ (Fig. 2) of U-section preferably stamped from sheet metal or by an analogous expedient. The ends of said shoes are provided with brackets 50 of U-shaped section.

Said shoes carry two linings, one cylindrical $f$ and the other annular $g$ and are maintained in position of rest by two springs $h$ secured to said bracket 50 (Fig. 2) which apply them against two fixed stops $i_1$ and $i_2$ carried by the plate $j$, and by two springs $k$ (Fig. 3) which apply them against two stops $l$ carried by the plate $j$.

Two links $n$ forming a toggle joint, whose knee consists of a pin and eye connection $o$, are pivoted at $m$ to said brackets 50 respectively. Said knee $o$ bears against a push piece $p$ the end of which is provided with a plate $q$.

Said push-piece is adapted to be controlled either by a hydraulic arrangement composed of a bellows $r$ adapted to be displaced in a cylinder $s$, analogous to the arrangement described and claimed in my copending application Serial No. 35,740, filed June 8, 1925, for a hydraulic braking system, or by any other hydraulic arrangement employing a piston displaceable in a cylinder or a flexible membrane bearing on a rod.

Let it then be assumed that the two push-pieces $p$ are progressively pushed in by the means above described.

The two shoes $d$ and $e$ which are applied against the stops $i_1$ and $i_2$ first of all become displaced parallel to their plane, counter to the springs $k$ which are weaker than springs $h$ and then apply the linings $g$ against the surface $c$ of the drum $a$ thus assuring a light progressive braking of the said drum.

If the force is continued on the push-piece and increased, the shoes being no longer able to become displaced parallel to their plane, links $n$, by bearing against the pivot points $m$, spread the said points and consequently place the lining $f$ in contact with the surface $b$ of the drum $a$. There is then produced both braking by the annular linings $g$ and by the cylindrical linings $f$, that is, a braking power which is considerably magnified.

Finally, if the force on the push-pieces is further increased, the shoes already applied to the drum are carried along in the direction of rotation thereof, for example, in the direction of the arrow F (Fig. 2). The shoe $d$ comes to bear against the stop $i_2$ and abuts thereagainst while the shoe $e$ comes to bear against the stop $i_1$ and abuts thereagainst. This is made possible by the fact that the sliding contact between $o$ and $q$ allows said rotation of the shoes.

There is therefore obtained a very energetic braking, the two shoes working therefore in their direction of turning.

In the case where the vehicle is very heavy, it is necessary to have a more energetic braking and it may be advantageous to make use of the embodiment of my invention shown in Fig. 5 which comprises self-tightening brake shoes.

Shoes $d_1$ and $e_1$ are separated from stop $i_3$ by means of links $n$ forming a toggle joint as above described. If the drum rotates in the direction of arrow $F_1$, shoe $d_1$ will be carried along in this direction and will impart a rotary displacement to shoe $e_1$ through toggle links $n_1$ the ends of which are kept at the same distance from each other by the action of push-piece $q$ on the knee $o_1$ of the toggle joint.

Shoe $e_1$ is accordingly angularly displaced until it bears against stop $i_3$ which produces an extremely energetic braking.

This movement is made possible by substituting for the lower stop $i_2$ of the embodiment shown in Fig. 2 two stops $i_4$ and $i_5$ and for the lower spring $h$ two springs $h_2$ and $h_3$ tending to continually apply the shoes against said stops.

In particular, as shown in Fig. 4, I may replace the two levers $n$ by a single leaf spring $n_2$ upon which the plate $q$ of the push-piece $p$ acts.

Having described my invention what I claim as new and desire to secure by Letters Patent is:

1. A brake assembly comprising a brake drum having cylindrical and annular internal braking surfaces, a pair of brake shoes mounted inside said brake drum and having cylindrical and annular surfaces adapted to coact with those of the brake drum, said shoes being displaceable toward and away from one another and lying in substantially the same plane, deformable means connected to and extending between said brake shoes, said deformable means having a greater length than the maximum possible distance between said shoes when mounted inside the drum, and means for exerting pressure on said deformable means intermediate the extremities thereof in a direction forming an angle with the plane in which the brake shoes lie, whereby said shoes are successively forced outwardly in contact with the cylindrical frictional surfaces of the drum and then laterally into contact with the annular frictional surfaces of the latter.

2. A structure as defined in claim 1, in combination with spring means tending to draw said brake shoes toward one another.

3. A structure as defined in claim 1, in combination with stop means operative to limit the rotation of said shoes relatively to said drum.

4. A structure as defined in claim 1, in combination with spring means tending to move the annular portions of the shoes out of contact with the drum.

5. A structure as defined in claim 1, in combination with spring means tending to draw said brake shoes toward one another, spring means tending to move the annular portions of the shoes away from the drum, and stop means operative to limit the relative rotation of the drum and shoes contained therein.

6. A brake assembly comprising a brake drum having cylindrical and annular internal braking surfaces, a pair of brake shoes mounted inside said drum and having cylindrical and annular surfaces adapted to coact with those of the brake drum, said shoes being displaceable toward and away from each other and lying in substantially the same plane, a stationary plate substantially parallel to said plane and located on the side of the brake shoes opposite to the brake drum, stops on said plate projecting between the adjacent extremities of the brake shoes, spring means tending to apply the extremities of said brake shoes against said stops, stops on said stationary plate adapted to engage the annular faces of said brake shoes, spring means for applying said annular faces against said stops, a toggle joint between said brake shoes disposed in a plane at right angles to the plane in which the brake shoes lie and means for exerting pressure on the knee of said toggle joint, whereby said shoes are successively forced outwardly in contact with the cylindrical frictional surfaces of the drum and then laterally into contact with the annular frictional surfaces of the latter.

7. A brake assembly comprising a brake drum having cylindrical and annular internal braking surfaces, a pair of substantially semicircular brake shoes mounted inside said drum and having cylindrical and annular surfaces adapted to coact with those of the brake drum, said shoes being displaceable toward and away from each other and lying in substantially the same plane, a stationary plate substantially parallel to said plane located on the side of the brake shoe opposite to the brake drum, two diametrically opposite stops on said plate projecting between the adjacent extremities of the brake shoes, two springs interposed between the adjacent extremities of the brake shoes respectively tending to apply said extremities against said stops, stops on said stationary plate adapted to engage the annular faces of said brake shoes, spring means for applying said annular faces against said last mentioned stops, two toggle joints mounted between the adjacent extremities of said brake shoes respectively, disposed in planes at right angles to the plane in which the brake shoes lie, and means for simultaneously exerting pressure on the knees of said toggle joints, whereby said shoes are successively forced outwardly in contact with the cylindrical frictional surfaces of the drum and then laterally into contact with the annular frictional surfaces of the latter.

8. A brake assembly comprising a brake drum having cylindrical and annular internal braking surfaces, a pair of brake shoes mounted inside said drum and having cylindrical and annular surfaces adapted to coact with those of the brake drum, said shoes being displaceable toward and away from each other and lying in substantially the same plane, a stationary plate substantially parallel to said plane and located on the side of the brake shoes opposite to the brake drum, stops on said plate projecting between the adjacent extremities of the brake shoes, spring means tending to apply the extremities of said brake shoes against said stops, stops on said stationary plate adapted to engage the annular faces of said brake shoes, spring means for applying said annular faces against said stops, curved leaf springs interconnecting the adjacent extremities of said shoes, and means for exerting pressure on said leaf springs intermediate the extremities thereof in a direction forming an angle with the plane in which the brake shoes lie, whereby said shoes are successively forced outwardly into contact with the cylindrical frictional surfaces of the drum and then laterally into contact with the annular frictional surfaces of the latter.

9. A brake assembly comprising a brake drum having cylindrical and annular internal braking surfaces, a pair of substantially semicircular brake shoes mounted inside said drum and having cylindrical and annular surfaces adapted to coact with those of the brake drum, said shoes being displaceable toward and away from each other and lying in substantially the same plane, a stationary plate substantially parallel to said plane and located on the side of the brake shoes opposite to the brake drum, a stop on said plate projecting between two adjacent extremities of said brake shoes, a spring tending to apply said adjacent extremities of the brake shoes against said stop, two toggle joints mounted between the adjacent extremities of said brake shoes respectively disposed in planes at right angles to the plane in which the brake shoes lie and means for exerting pressure on the knees of said toggle joints, two stops on said stationary plate adapted to engage the inner edges of the annular surfaces of the brake shoes respectively, and two springs tending to draw the brake shoes against said stops, whereby said shoes are successively forced outwardly into contact with the cylindrical frictional surfaces of the drum, then laterally into contact with the annular frictional surfaces of the latter and finally slightly rotated together with the drum until one of the brake shoes is strongly applied against the first mentioned stop.

In testimony whereof I have signed this specification.

MAURICE CHARLES.